Sept. 8, 1964  H. T. M. RICE  3,147,638
CRANKSHAFT APPARATUS
Filed May 1, 1961
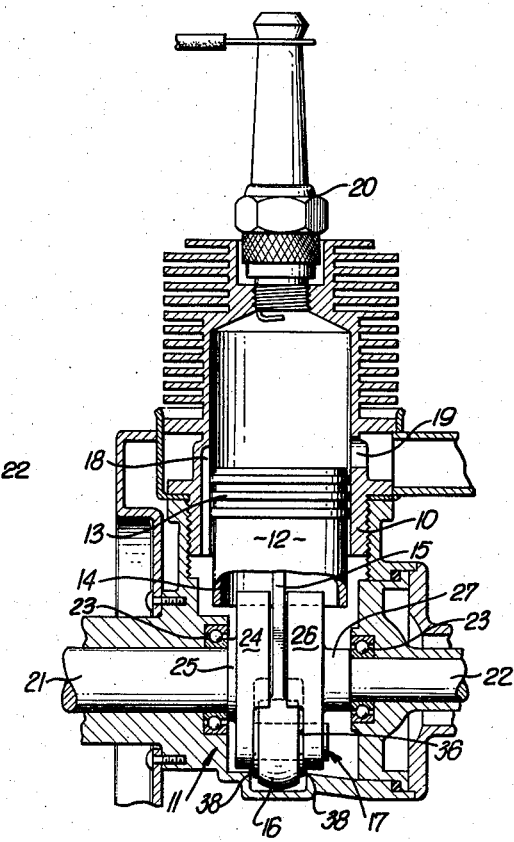
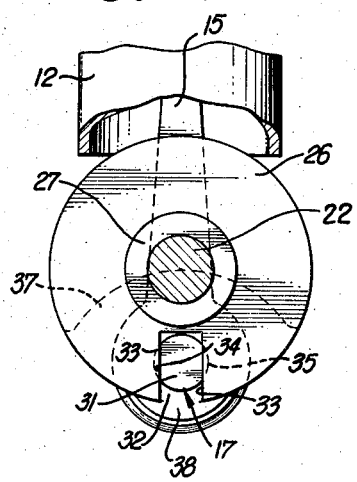
HENRY T. M. RICE
INVENTOR.
BY
Bernard Kriegel
ATTORNEY.

United States Patent Office 3,147,638
Patented Sept. 8, 1964

3,147,638
CRANKSHAFT APPARATUS
Henry T. M. Rice, San Gabriel, Calif., assignor to Ohlsson & Rice, Inc., Los Angeles, Calif., a corporation of California
Filed May 1, 1961, Ser. No. 106,694
4 Claims. (Cl. 74—595)

The present invention relates to crankshafts, and more particularly to crankshafts used in internal combustion engines, pumps, compressors, and similar apparatus.

An object of the invention is to provide a crankshaft made of several parts that are easily assembled in association with one another and a connecting rod, and which enables the end of the connecting rod mounted on the crankpin to be made in one piece. By permitting the use of a one-piece connecting rod, the latter can be more compact and allows the crankcase to be made correspondingly smaller.

Another object of the invention is to provide a crankshaft inluding oppositely directed separate shaft sections, in which misalignment between the shaft sections does not interfere with proper operation of the crankshaft, and in which the load carrying capacity and the life of the several parts of the crankshaft are greatly enhanced.

A further object of the invention is to provide a crankshaft having oppositely directed separate shaft sections secured to opposed crank discs, there being a crankpin separate from but coupled to one of the discs in such manner as to compensate for any misalignment between the shaft sections, and also to provide a large bearing surface of contact between the crankpin and the crank disc to which it is coupled, thereby enabling the crankshaft to have a large load transmitting capacity and insuring long life of the parts.

An additional object of the invention is to provide a crankshaft having oppositely directed separate shaft sections secured to opposed separate crank discs, in which the crankpin limits inward movement of the crank discs toward each other, thereby allowing for the proper operation of the crankshaft without interference with a connecting rod located between the discs and mounted on the crankpin.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a vertical section through an internal combustion engine embodying the invention, parts being shown in side elevation;

FIG. 2 is a vertical section through the crankshaft and connecting rod portion of the apparatus illustrated in FIG. 1;

FIG. 3 is an end view taken along the line 3—3 on FIG. 2.

A crankshaft apparatus is disclosed in the drawings as forming part of an internal combustion engine having a suitable cylinder 10 secured to a crankcase 11, which may be made of several parts, there being a piston 12 slidably mounted in the cylinder, including the usual ring bearing head 13 and the depending piston skirt 14, the piston being of generally cup-shape form. A connecting rod 15 is secured at one end to the wrist pin (not shown) mounted in the piston and at its other or big end 16 to the crankpin 17 of the crankshaft apparatus. Although not essential to an understanding of the present invention, the internal combustion engine illustrated in FIG. 1 may have a suitable inlet port or ports 18 for fuel and an exhaust port or ports 19, as well as a suitable ignition device in the head end of the cylinders, such as a spark plug 20, the engine being of the two-cycle type.

The crankshaft apparatus includes separate and opposed shaft sections 21, 22 arranged on opposite sides of the connecting rod 15, these sections being suitably rotatably mounted in the crankcase 11. As disclosed, longitudinally spaced bearings 23 are mounted in the crankcase 11 and rotatably support each shaft section 21, 22, as well as limit outward axial movement of the shaft sections. One of the shaft sections, as the left section 21 disclosed in FIGS. 1 and 2, has a crank arm or disc 24 integral therewith having a boss 25 engaging the inner race of the inner bearing 23, thereby limiting outward axial movement of the crank disc 24 and its integral shaft 21 relative to the crankcase. Similarly, an opposed crank arm or disc 26, spaced axially from the other disc 24, is integral with the other shaft section 22, there also being a boss 27 integral with the crank disc 26 and shaft section 22 engaging the inner race of the adjacent bearing 23 to prevent axial movement of the shaft 21 and crank section 22 in a direction outwardly of the crankcase 11.

The crank discs 24, 26 are axially spaced apart a distance sufficient to allow the connecting rod 15 to operate therebetween, the end 16 of the connecting rod being made of one piece that is circumferentially continuous, there being a bore 28 through the big end of the connecting rod through which the crankpin 17, integral with and extending from one crank disc 24, can pass. A suitable radial bearing 29 is mounted in the end 16 of the connecting rod for cooperation therewith and with the cylindrical portion 30 of the crankpin 17.

Although it is integral with one crank disc 24 and extends parallel to the axis of the crankshaft sections 21, 22, the free end portion 31 of the crankpin 17 extends into a radial slot 32 provided in the opposed crank disc 26 which opens through its periphery. This radial slot 32 has opposed parallel flat faces 33 cooperating with companion parallel flat faces 34 provided on the crankpin portion 31, the flat faces 34 on the crankpin making a close slidable fit with the sides 33 of the crank disc defining the radial slot 32. The formation of the parallel flat faces 34 on the crankpin 17 results in a pair of shoulders 35 on the crankpin at the inner ends of the flat faces 31 and normal thereto, these shoulders engaging the inner surface 36 of the crank disc 26 on opposite sides of its slot 32.

The bearings 23 rotatably mounting the shaft sections 21, 22 in the crankcase 11 are spaced apart a distance such that the engagement of the bosses 25, 27 on the crank discs 24, 26 therewith will space the inner faces of the crank discs apart a sufficient amount as to permit free movement of the connecting rod 15 therebetween. Inasmuch as the end 16 of the connecting rod is enlarged in axial extent, the opposed inner portions 37 of the crank discs are recessed to allow the big end of the connecting rod to move therewithin during rotation of the crankshaft and reciprocation of the connecting rod 15 and the piston 12 connected thereto. Axial movement of the connecting rod 15 along the pin 17, while permitting free relative movement therebetween, is limited by providing thrust elements 38, such as washers, between the end faces of the big end 16 of the connecting rod and the inner walls 36 of the crank disc recesses. Inward movement of the crank discs 24, 26 toward each other is prevented by engagement of the crank disc surfaces 36 on opposite sides of the slot 32 with the shoulders 35 on the crankpin 17 at the inner ends of its flat faces 34.

It is, accordingly, apparent that the crankshaft cannot move axially to any significant extent in the crankcase. Any tendency for the crank disc 24 and its integral shaft section 21 to move outwardly is prevented by engagement of its boss 25 with the adjacent inner bearing 23. If the crank disc 24 and shaft 21 attempt to move axially in the opposite direction, such axial movement is prevented by engagement of the shoulders 35 on the crankpin 17 with the opposed crank disc 26, which is engaging the other inner bearing 23. Similarly, axial movement of the opposed crank disc 26 and its shaft section 22 toward the other crank disc 24 is prevented by engagement of the slotted crank disc 24 with the shoulders 35, such motion than being transmitted through the disc 24 to its inner bearing 23, which is mounted within the crankcase 11.

The crankshaft apparatus disclosed and described possesses many desirable features and advantages. It allows the big end 16 of the connecting rod 15 to be made in one piece, thereby adding to its strength, and, for the same diameter of crankpin 17, holding the external dimensions of the big end of the crankshaft to a relatively low value (as compared to making such big end of a plurality of pieces bolted or otherwise secured together). Accordingly, the big end 15 of the connecting rod can be made relatively compact. This also allows the crank discs 24, 26 to be made more compact, inasmuch as the big end of the connecting rod can easily move freely within the opposed recesses 37 in the crank discs. This overall compactness also allows the crankcase 11 to be made smaller, inasmuch as the parts are moving through smaller paths therewithin.

The crankshaft apparatus and connecting rod 15 are easily assembled. The connecting rod 15 with its bearing 29 and thrust elements 38 are readily mounted over the cylindrical portion of the crankpin, which is integral with one of the crank discs 24, whereupon the slotted portion of the opposed crank disc 26 is slipped over the end portion 31 of the crankpin having the flat sides 34. This structure is readily assembled in the crankcase 11, inasmuch as the crankcase is made or can be made in a plurality of pieces. As shown, after the crankshaft assembly has been mounted in place with the connecting rod 15 thereon, the end portion 11a of the crankcase 11 can be slipped over the shaft section 22 until its bearing 23 engages the crankshaft boss 27.

Following assembly of the apparatus, the shaft sections 21, 22 should be and are preferably coaxial. Accordingly, during reciprocation of the piston 12, the connecting rod 15 acts through the crankpin 17 to rotate the crankshaft, the drive being transmitted between the crankpin 17 and the crank disc 24 integral with it, and also through the flat faces 34 of the crankpin to the flat sides 33 of the slotted portion of the opposed crank disc 26, to rotate both shaft sections 21, 22. In transmitting the drive, it is to be noted that there is a close fit between the flat faces 34 of the pin 17 and the parallel sides 33 of the slot 32, which provide a large area of contact between each flat side and slot side, furnishing a large bearing surface between the pin 17 and the disc 26 for transmitting loads. There is no concentration of wear as occurs, for example, between a cylindrical pin and a companion cylindrical bore in which it is received. Because of manufacturing tolerances required between parts, a cylindrical pin engaging the wall of a companion cylindrical bore would have made only a line contact therewith, along which the load would be concentrated, resulting in wear between the parts and their relatively short life. The large bearing surface between the pin 17 and the side 33 of the slot 32, in the present case, enables fairly large loads to be transmitted at a low unit pressure, which insures long life of the several parts.

The slotted disc and pin connection affords yet a further advantage. In the event that the shaft sections 21, 22 have some misalignment, binding between the parts does not occur, the shaft sections 21, 22 being rotated freely during reciprocation of the piston 12 and connecting rod 15 in turning the shafts, inasmuch as there can be a slight radial movement of the pin portion 31 in the slotted disc 26. Despite such slight radial movement, the parts still have a long life, inasmuch as there is a large bearing surface of contact between the sides 34 of the pin and the sides 33 of the companion slot 32 in the disc 26.

The formation of the pin with the flat parallel faces 34 for making surface contact with the sides 33 of the slot 32 also produces the end shoulders 35 that serve to limit inward movement of the crank discs 24, 26 and of the shaft sections 21, 22 toward each other, as described above.

I claim:

1. In a crankshaft adapted to have the crank end of a one-piece connecting rod mounted thereon: separate shaft sections; opposed crank arms integral with said sections and axially separated from one another to allow the connecting rod to be disposed therebetween; one of said arms having a generally radial slot; a unitary cylindrical crankpin integral with and extending from the other of said arms and disposed in said slot in spaced relation to the inner end of said slot and adapted to slide relatively radially inwardly and outwardly in said slot during rotation of the crankshaft in the event of misalignment between said shaft sections; said cylindrical crankpin enabling the crank end of the connecting rod to be assembled on the crankpin lengthwise thereof; the sides of said slot being substantially parallel to each other; the portion of said crankpin in said slot having opposed generally parallel sides in surface contact with the sides of said slot; said crankpin having shoulders at the inner ends of said sides of said crankpin engageable with said one of said arms to limit axial movement of said arms toward each other.

2. In a crankshaft adapted to have the crank end of a one-piece connecting rod mounted thereon: first and second separate shaft sections; first and second crank arms integral with said first and second sections, respectively, and axially separated from one another to allow the connecting rod to be disposed therebetween; said first arm having a generally radial slot; a unitary cylindrical crankpin integral with and extending from said second arm and disposed in said slot in spaced relation to the inner end of said slot and adapted to slide relatively radially inwardly and outwardly in said slot during rotation of the crankshaft in the event of misalignment between said shaft sections; said cylindrical crankpin enabling the crank end of the connecting rod to be assembled on the crankpin lengthwise thereof; the sides of said slot being substantially parallel to each other; the portion of said crankpin in said slot having opposed generally parallel sides in surface contact with the sides of said slot.

3. In a crankshaft adapted to have the crank end of a one-piece connecting rod mounted thereon: separate first and second shaft sections; opposed first and second crank discs integral with said first and second sections, respectively, and axially separated from one another to allow the connecting rod to be disposed therebetween; said discs having opposed inner recesses to accommodate the crank end of the connecting rod; said first disc having a generally radial slot in its recessed portion; a unitary cylindrical crankpin integral with and extending from the recessed portion of said second disc and disposed in said slot in spaced relation to the inner end of said slot and adapted to slide relatively radially inwardly and outwardly in said slot during rotation of the crankshaft in the event of misalignment between said shaft sections; said cylindrical crankpin enabling the crank end of the connecting rod to be assembled on the crankpin lengthwise thereof; the sides of the slot being substantially parallel to each other; the portion of said crankpin in said slot having opposed generally parallel sides in surface contact with the sides of said slot.

4. In a crankshaft adapted to have the crank end of a one-piece connecting rod mounted thereon: separate first and second shaft sections; opposed first and second crank discs integral with said first and second sections, respectively, and axially separated from one another to allow the connecting rod to be disposed therebetween; said discs having opposed inner recesses to accommodate the crank end of the connecting rod; said first disc having a generally radial slot in its recessed portion; a unitary cylindrical crankpin integral with and extending from the recessed portion of said second disc and disposed in said slot in spaced relation to the inner end of said slot and adapted to slide relatively radially inwardly and outwardly in said slot during rotation of the crankshaft in the event of misalignment between said shaft sections; said cylindrical crankpin enabling the crank end of the connecting rod to be assembled on the crankpin lengthwise thereof; the sides of the slot being substantially parallel to each other; the portion of said crankpin in said slot having opposed generally parallel sides in surface contact with the sides of said slot; said crankpin having shoulders at the inner ends of said sides of said crankpin engageable with said first disc on opposite sides of its slot to limit movement of said discs toward each other.

References Cited in the file of this patent

UNITED STATES PATENTS

| | | |
|---|---|---|
| 452,964 | Bronder | May 26, 1891 |
| 652,972 | Lusibrink | July 3, 1900 |
| 1,363,957 | Cote | Dec. 28, 1920 |
| 1,765,927 | Maier | June 24, 1930 |

FOREIGN PATENTS

| | | |
|---|---|---|
| 973,051 | France | Sept. 6, 1950 |